No. 855,375. PATENTED MAY 28, 1907.
W. B. YOUNG.
PRINTING FRAME.
APPLICATION FILED MAR. 31, 1906. RENEWED APR. 15, 1907.

Witnesses.

Inventor
Wm B. Young.

By
His Atty.

UNITED STATES PATENT OFFICE.

WILLIAM BRUCE YOUNG, OF BRANDON, MANITOBA, CANADA.

PRINTING-FRAME.

No. 855,375. Specification of Letters Patent. Patented May 28, 1907.

Application filed March 31, 1906. Renewed April 15, 1907. Serial No. 368,378.

*To all whom it may concern:*

Be it known that I, WILLIAM BRUCE YOUNG, of the city of Brandon, in the Province of Manitoba, Canada, photographer, have invented certain new and useful Improvements in Printing-Frames, of which the following is the specification.

My invention relates to improvements in printing frames, and the object of the invention is to provide means which will overcome the difficulty heretofore experienced in the judging of the time of exposure of a print, and it consists essentially of a frame having the usual spring pressed removable portion, and provided with a sheet of glass or other transparent material all arranged and constructed as hereinafter more especially described.

Figure 1:
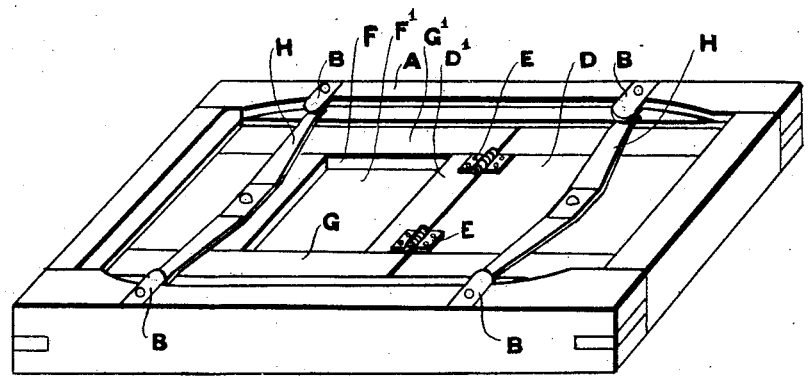
Figure 2:
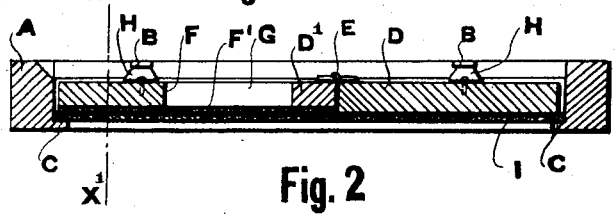
Figure 3:
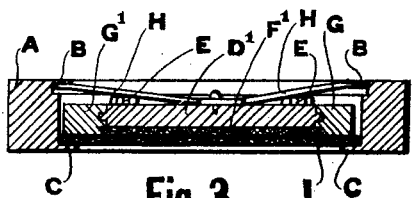

Figure 1 is a rear perspective view of my complete printing frame. Fig. 2 is a vertical longitudinal sectional view, the section being taken through the center of the frame. Fig. 3 is a vertical sectional view through my complete frame, the section being in the plane as indicated by line X X$^1$ Fig. 2.

In the drawings like letters of reference indicate corresponding parts in each figure.

A is the ordinary form of rectangular printing frame, having the lipped opposing plates B extending inwardly from the rear face thereof, and the flange C extending inwardly around the front face.

D, is a portion of the back and is of the ordinary form. Secured thereto by means of hinges E is a portion D$^1$, having an opening F and a transparent substance F$^1$, such as glass or the like secured therein. The glass F$^1$ is to lie flush with the front face of the two side portions G G$^1$ and is dovetailed into said portions, thus securing it therein. The two portions D D$^1$, are removably secured in the frame A, by the springs H, coacting with the lips B as in the ordinary form of printing frame.

My printing frame is more especially adapted to sun printing and when it is desired to make an exposure, the negative I is placed in the frame A bearing on the flange C and the sensitized paper and the back are placed and secured as in the ordinary manner.

The advantage gained by the transparent opening, is simply this: Heretofore when it was required to judge the print it was necessary to undo and turn back either one of the portions D or D$^1$, thereby being able to look directly at the print itself. This necessitated considerable loss of time as well as the constant danger of moving the sensitized paper. In my invention such is overcome, the length of the exposure being timed by simply looking through the transparent back and judging the exposure by the depth of the print. With a little experience such can be judged very accurately.

It is to be understood that although I show one method of securing the transparent material in the back of the removable portion of the frame, within the scope of the appended claims, other such suitable means may be employed without departing from the spirit of my invention.

What I claim as my invention is:

1. A printing frame comprising a frame provided with flanges to receive the negative, and a removable back for holding the sensitive paper against the negative, said back having an opening with a transparent material therein, as and for the purpose specified.

2. In a device of the class described, the combination with the receiving frame, and the spring pressed removable back, of a transparent material within the back, as and for the purpose specified.

3. In a printing frame, the combination with the receiving frame of a spring pressed removable back, said back being composed of two portions hinged together, one portion of which has an opening extending therethrough and a transparent material secured to and flush with the inner face thereof, as and for the purpose specified.

4. In a printing frame, the combination with the receiving frame of a removably secured back, said back being composed of two portions hinged together, one portion of which has an opening extending therethrough and grooves cut in the outstanding sides, so placed and designed to secure and hold the glass flush with the inner face of the back, as and for the purpose specified.

WILLIAM BRUCE YOUNG.

Witnesses:
JENNIE GRANT,
S. E. CLEMENT.